US012363483B2

(12) United States Patent
Du et al.

(10) Patent No.: US 12,363,483 B2
(45) Date of Patent: Jul. 15, 2025

(54) SPEAKER

(71) Applicant: AAC Microtech (Changzhou) Co., Ltd., Jiangsu (CN)

(72) Inventors: Xiwen Du, Changzhou (CN); Long Zhang, Changzhou (CN); Yu Qi, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 309 days.

(21) Appl. No.: 18/324,139

(22) Filed: May 25, 2023

(65) Prior Publication Data

US 2024/0284116 A1 Aug. 22, 2024

Related U.S. Application Data

(63) Continuation of application No. PCT/CN2023/076313, filed on Feb. 16, 2023.

(51) Int. Cl.
*H04R 9/06* (2006.01)
*H04R 9/02* (2006.01)
*H04R 9/04* (2006.01)
*H04R 7/04* (2006.01)

(52) U.S. Cl.
CPC ............. *H04R 9/063* (2013.01); *H04R 9/025* (2013.01); *H04R 9/047* (2013.01); *H04R 7/045* (2013.01); *H04R 2400/11* (2013.01)

(58) Field of Classification Search
CPC ........ H04R 9/063; H04R 9/025; H04R 9/047; H04R 7/045; H04R 2400/11
See application file for complete search history.

(56) References Cited

U.S. PATENT DOCUMENTS

2020/0045453 A1* 2/2020 Xiao ........................ H04R 9/06
2022/0322013 A1* 10/2022 Lv .......................... H04R 9/046
2024/0073620 A1* 2/2024 Ren .......................... H04R 7/18

* cited by examiner

*Primary Examiner* — Suhan Ni
(74) *Attorney, Agent, or Firm* — Wiersch Law Group

(57) ABSTRACT

The present invention provides a speaker including a first frame, a second frame forming a receiving room with the first frame, a first vibration system, a second vibration system, and a magnetic circuit system. The first vibration system includes a first diaphragm and a first voice coil. The second vibration system includes a second diaphragm and a second voice coil. Winding planes of the first voice coil and the second voice coil are parallel to a vibration direction of the first diaphragm. Taking a center point of the speaker as the center, a structure of the first voice coil is centrosymmetric with the structure of the second voice coil. The speaker of the present invention is narrower in size, the upper and lower amplitudes are synchronized, and the functions are diverse. The two diaphragms can be driven separately to achieve the effect of sensitivity superposition.

8 Claims, 3 Drawing Sheets

SPEAKER

FIELD OF THE PRESENT INVENTION

The present invention relates to the field of electro-acoustic conversion, and more particularly, to a back-to-back speaker.

DESCRIPTION OF RELATED ART

Speaker, also known as horn, is used in speaker boxes to convert audio signals into sound. As customers' requirements for consumer electronics products increase, the speakers are given more requirements.

Back-to-back speaker refers to the speaker has two groups of vibration systems, and the two groups of vibration systems are set back to back. In related art, the back-to-back speaker includes two diaphragms and two voice coils, and the two voice coils are set up and down. The larger voice coil is arranged around the smaller voice coil. The two voice coils are driven separately. The width of this back-to-back speaker is limited, so it cannot be made into a very narrow size, and the amplitudes of two diaphragms are not synchronized. The leakage prevention effect of the speaker is poor.

In another related art, the back-to-back speaker also includes two diaphragms and two voice coils, and two voice coils are located between the two diaphragms. One side of first voice coil and one side of the second voice coil are attached to the first diaphragm, and the other side of the first voice coil and the other side of the second voice coil are attached to the second diaphragm. The upper and lower diaphragms of the speaker vibrate in the same direction. The leakage prevention effect of this kind of back-to-back speaker is good, but the function is single. The two diaphragms can only vibrate in the same direction. They can not be controlled separately and the speaker has a poor sensitivity.

Therefore, it is desired to provide a new speaker which can overcome the above problems.

SUMMARY

In view of the above, the embodiment of the present invention provides a new speaker. By the present invention, the size of the speaker is narrow, the function of the speaker is diversified, and the sensitivity of the speaker is high.

The present invention provides a speaker including a first frame, a second frame fixed with the first frame and cooperatively forming a receiving room with the first frame, a first vibration system supported on a side of the first frame distal to the second frame, a second vibration system supported on a side of the second frame distal to the first frame, and a magnetic circuit system accommodated in the receiving room. The first vibration system includes a first diaphragm and a first voice coil connected with the first diaphragm and driving the first diaphragm to generate sounds. The second vibration system includes a second diaphragm and a second voice coil connected with the second diaphragm and driving the second diaphragm to generate sounds. Winding planes of the first voice coil and the second voice coil are parallel to a vibration direction of the first diaphragm. Taking a center point of the speaker as the center, a structure of first voice coil is centrosymmetric with the structure of the second voice coil.

As an improvement, the magnetic circuit system includes a pair of first magnets spaced apart from each other to form a first magnetic gap and a pair of second magnets spaced apart from each other to form a second magnetic gap, the first voice coil at least partially located in the first magnetic gap, and the second voice coil at least partially located in the second magnetic gap.

As an improvement, the pair of the first magnets is flush with the pair of second magnets.

As an improvement, the magnetic circuit system further includes a first pole plate connected to a side of the first magnets and the side of the second magnets proximal to the first diaphragm, and a second pole plate connected to the side of the first magnets and the side of the second magnets proximal to the second diaphragm.

As an improvement, the first pole plate includes a first through slot avoiding the first voice coil and the second voice coil, and the second pole plate includes a second through slot avoiding the first voice coil and the second voice coil.

As an improvement, the first pole plate is embedded and fixed in the first frame, and the second pole plate is embedded and fixed in the second frame.

As an improvement, the first vibration system further includes a first circuit board located between the first frame and the first diaphragm, the first circuit board including a first fixation portion mounted with the first frame, a second fixation portion mounted with the first diaphragm, and a first connection portion connecting the first fixation portion and the second fixation portion, the first voice coil secured with the first diaphragm through the second fixation portion, the second vibration system further including a second circuit board located between the second frame and the second diaphragm, the second circuit board including a third fixation portion mounted with the second frame, a forth fixation portion mounted with the second diaphragm, and a second connection portion connecting the third fixation portion and the forth fixation portion, the second voice coil secured with the second diaphragm through the forth fixation portion.

As an improvement, the speaker further includes a first pin embedded in the first frame to electrically connect the first circuit board with an external circuit, and a second pin embedded in the second frame to electrically connect the second circuit board with the external circuit.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
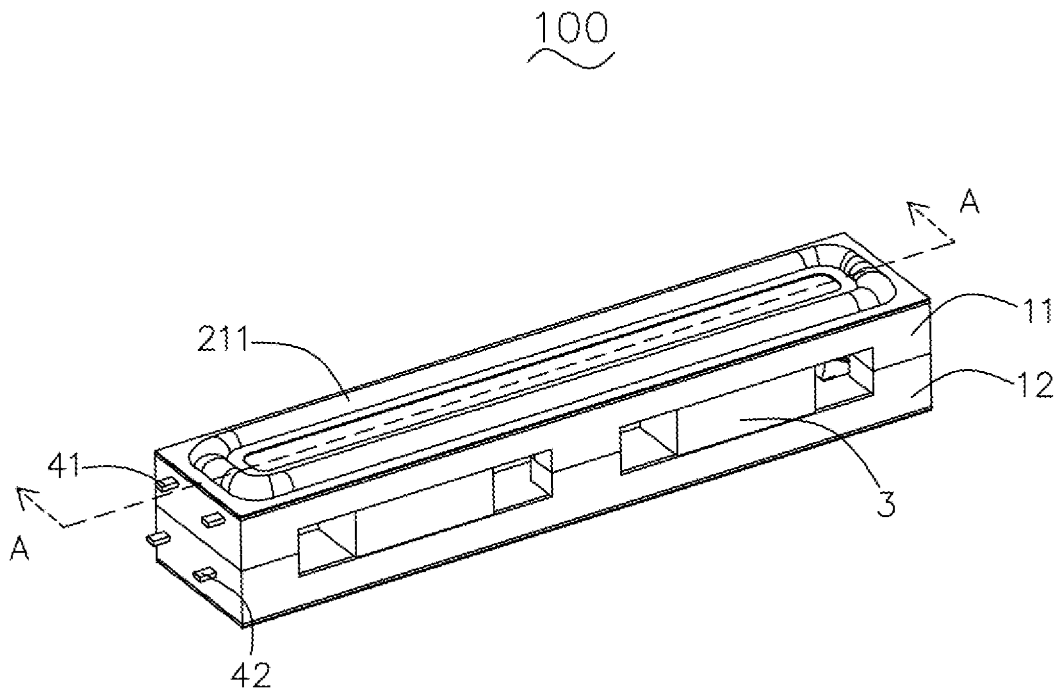
FIG. 1 is an illustrative isometric view of a speaker in accordance with one embodiment of the present invention.
Figure 2:
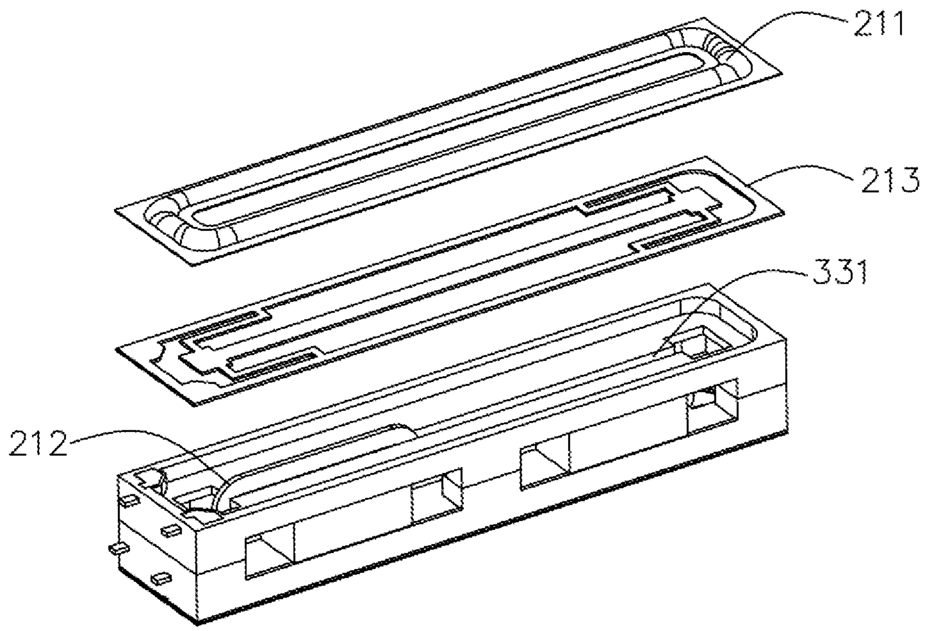
FIG. 2 is a partially exploded view of the speaker of FIG. 1.
Figure 3:
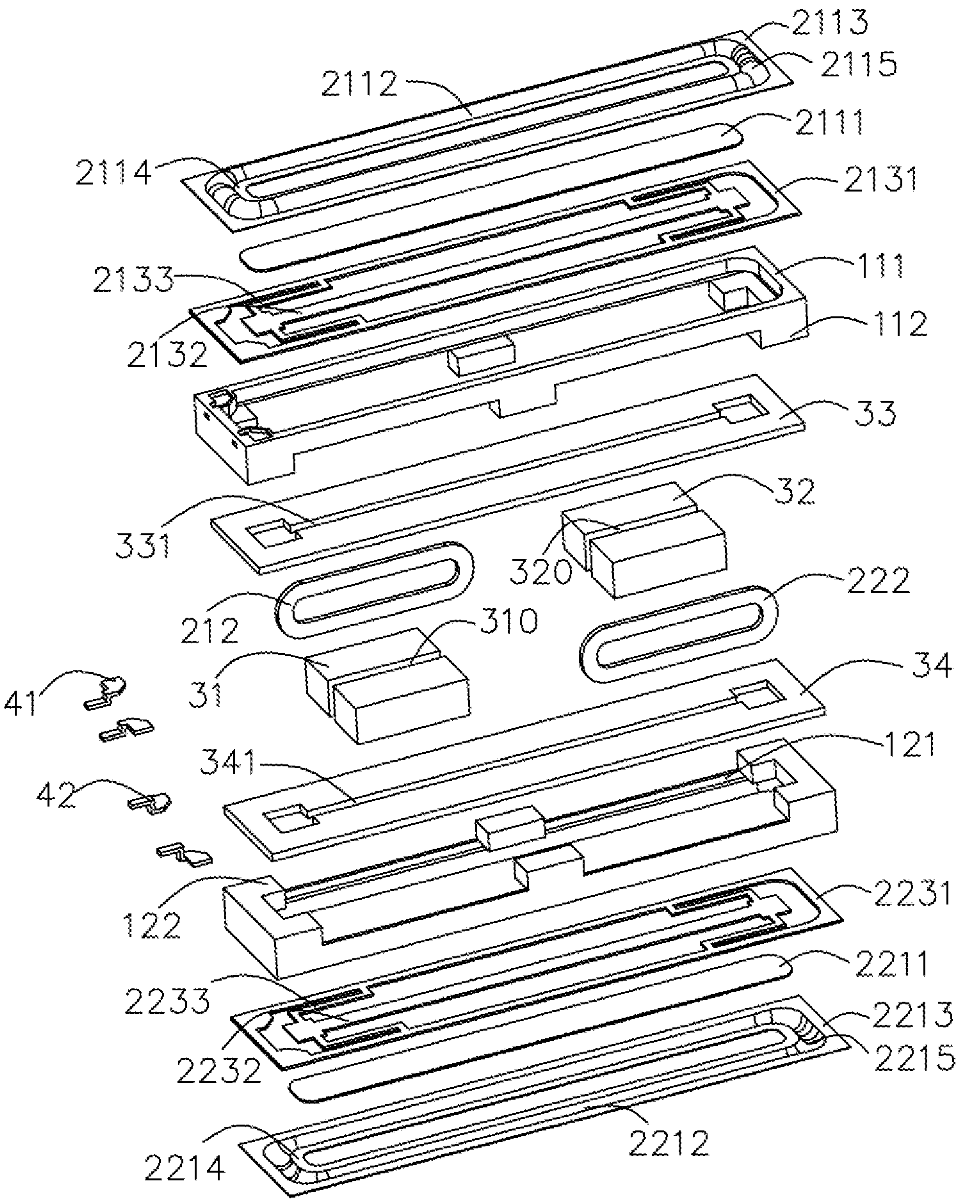
FIG. 3 is an exploded view of the speaker of FIG. 1.
Figure 4:
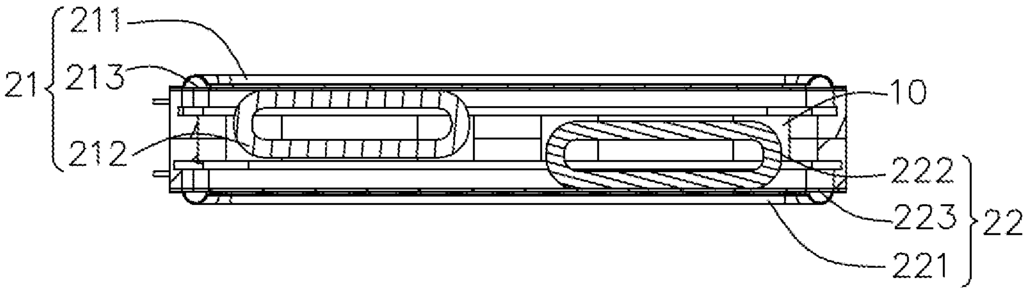
FIG. 4 is an illustrative cross-sectional view of the speaker taken along line A-A of FIG. 1.

Referring to the FIGS. 1-4, the present invention provides one embodiment of a speaker 100. The speaker 100 includes a first frame 11, a second frame 12 fixed with the first frame 11 and cooperatively forming a receiving room 10 with the first frame 11, a first vibration system 21 supported on a side of the first frame 11 distal to the second frame 12, a second vibration system 22 supported on a side of the second frame 12 distal to the first frame 11, a magnetic circuit system 3 accommodated in the receiving room 10, a first pin 41 embedded in the first frame 11, and a second pin 42 embedded in the second frame 12. The magnetic circuit system 3 drives the first vibration system 21 and the second vibration system 22 to vibrate and sound. The speaker 100 has a rectangular shape.

The first frame 11 is a rectangular annular hollow structure, and the first frame 11 includes an annular first main part 111 and a plurality of first supporting parts 112 extending from the first main part 111. The number of the first supporting part 112 is multiple, and the adjacent first supporting parts 112 are spaced apart from each other.

The structure of the second frame 12 is same as the structure of the first frame 11. The second frame 12 is also a rectangular annular hollow structure, and the second frame 12 includes an annular second main part 121 and a plurality of second supporting parts 122 extending from the second main part 121. The number of the second supporting part 122 is multiple, and the adjacent second supporting parts 122 are spaced apart from each other. Each first supporting part 112 abuts against the corresponding second supporting part 122.

The first vibration system 21 includes a first diaphragm 211, a first voice coil 212 connected with the first diaphragm 211 and driving the first diaphragm 211 to generate sounds, and a first circuit board 213 located between the first frame 11 and the first diaphragm 211. The sound direction of the first diaphragm 211 is upward along the vibration direction, that is, the sounding direction of the first diaphragm 211 is in front of the speaker 100. The first diaphragm 211 includes a first dome 2111 and a first suspension 2112 with a ring shape. The first suspension 2112 is arranged surrounding the first dome 2111. The first suspension 2112 includes a first end portion 2113 mounted to the first main part 111 of the first frame 11, a second end portion 2114 mounted to the first dome 2111, and a first suspension portion 2115 connecting the first end portion 2113 and the second end portion 2114.

The first voice coil 212 is placed vertically, that is, a winding plane of the first voice coil 212 is parallel to the vibration direction of the first diaphragm 211. The first circuit board 213 includes a first fixation portion 2131 mounted with the first frame 11, a second fixation portion 2132 mounted with the first diaphragm 211, and a first connection portion 2133 connecting the first fixation portion 2131 and the second fixation portion 2132. The first fixation portion 2131 has an annular shape and is sandwiched between the first frame 11 and the first end portion 2113 of the first suspension 2112. The second fixation portion 2132 has a long strip shape and is attached to the first dome 2111. The first voice coil 212 is secured with the first diaphragm 211 through the second fixation portion 2132. The first connection portion 2133 locates on the position of the first suspension portion 2115.

The second vibration system 22 has a same structure with the first vibration system 21. The second vibration system 22 includes a second diaphragm 221 and a second voice coil 222 connected with the second diaphragm 221 and driving the second diaphragm 221 to generate sounds, and a second circuit board 223 located between the second frame 12 and the second diaphragm 221. The sound direction of the second diaphragm 221 is downward along the vibration direction, that is, the sounding direction of the second diaphragm 221 is in back of the speaker 100. The second diaphragm 221 includes a second dome 2211 and a second suspension 2212 with a ring shape. The second suspension 2212 is arranged surrounding the second dome 2211. The second suspension 2212 includes a third end portion 2213 mounted to the second main part 121 of the second frame 12, a forth end portion 2214 mounted to the second dome 2211, and a second suspension portion 2215 connecting the third end portion 2213 and the forth end portion 2214.

The second voice coil 222 is placed vertically, that is, the winding plane of the second voice coil 222 is parallel to the vibration direction of the second diaphragm 221. Taking a center point of the speaker 100 as the center, the first voice coil 212 is centrosymmetric with the second voice coil 222. A projection of the first voice coil 212 and the projection of the second voice coil 222 along the direction of vibration are on a line.

The second circuit board 223 includes a third fixation portion 2231 mounted with the second frame 12, a forth fixation portion 2232 mounted with the second diaphragm 221, and a second connection portion 2233 connecting the third fixation portion 2231 and the forth fixation portion 2232. The third fixation portion 2231 has an annular shape and is sandwiched between the second frame 12 and the third end portion 2213 of the second suspension 2212. The forth fixation portion 2232 has a long strip shape and is attached to the second dome 2211. The second voice coil 222 is secured with the second diaphragm 221 through the forth fixation portion 2232. The second connection portion 2233 locates on the position of the second suspension portion 2215.

The magnetic circuit system 3 includes a pair of first magnets 31 spaced apart from each other to form a first magnetic gap 310 and a pair of second magnets 32 spaced apart from each other to form a second magnetic gap 320, a first pole plate 33 connected to a side of the first magnets 31 and the side of the second magnets 32 proximal to the first diaphragm 211, and a second pole plate 34 connected to the side of the first magnets 31 and the side of the second magnets 32 proximal to the second diaphragm 221. The first voice coil 212 at least partially locates in the first magnetic gap 310, and the second voice coil 222 at least partially locates in the second magnetic gap 320. The pair of first magnets 31 is flush with the pair of second magnets 32.

The first pole plate 33 is embedded and fixed in the first frame 11, and the second pole plate 34 is embedded and fixed in the second frame 12. The first pole plate 33 includes a first through slot 331 avoiding the first voice coil 212 and the second voice coil 222, and the second pole plate 34 includes a second through slot 341 avoiding the first voice coil 212 and the second voice coil 222. The first through slot 331 can be a strip structure or can be a plurality of slots arranged at intervals to avoid the first voice coil 212 and the second voice coil 222 at the same time. Similarly, the second through slot 341 can be a strip structure or can be a plurality of slots arranged at intervals to avoid the first voice coil 212 and the second voice coil 222 at the same time.

The first pin 41 is embedded in the first frame 11 to electrically connect the first circuit board 213 with an external circuit, and a second pin 42 is embedded in the second frame 12 to electrically connect the second circuit board 223 with the external circuit.

Compared with related technologies, the present invention provides a speaker including a first frame, a second frame fixed with the first frame and cooperatively forming a receiving room with the first frame, a first vibration system supported on a side of the first frame distal to the second frame, a second vibration system supported on a side of the second frame distal to the first frame, and a magnetic circuit system accommodated in the receiving room. The first vibration system includes a first diaphragm and a first voice coil connected with the first diaphragm and driving the first diaphragm to generate sounds. The second vibration system includes a second diaphragm and a second voice coil connected with the second diaphragm and driving the second diaphragm to generate sounds. Winding planes of the first voice coil and the second voice coil are parallel to a vibration direction of the first diaphragm. Taking a center point of the speaker as the center, a structure of the first voice coil is centrosymmetric with the structure of the second voice coil. In the speaker of the present invention, the two voice coils are arranged vertically and each voice coil is attached to the corresponding diaphragm. Two voice coils drive the two diaphragms separately. So the size of the speaker in present invention is narrower, the upper and lower amplitudes of the two diaphragms are synchronized, the sound leakage prevention effect of the speaker is good, and the functions are diverse. The two diaphragms can be driven separately to achieve the effect of sensitivity superposition.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker, comprising:

a first frame;

a second frame fixed with the first frame and cooperatively forming a receiving room with the first frame;

a first vibration system supported on a side of the first frame distal to the second frame, the first vibration system comprising a first diaphragm and a first voice coil connected with the first diaphragm and driving the first diaphragm to generate sounds, a winding plane of the first voice coil parallel to a vibration direction of the first diaphragm;

a second vibration system supported on a side of the second frame distal to the first frame, the second vibration system comprising a second diaphragm and a second voice coil connected with the second diaphragm and driving the second diaphragm to generate sounds, a winding plane of the second voice coil parallel to a vibration direction of the second diaphragm, taking a center point of the speaker as the center, the first voice coil centrosymmetric with the second voice coil; and a magnetic circuit system accommodated in the receiving room.

2. The speaker as described in claim 1, wherein the magnetic circuit system comprises a pair of first magnets spaced apart from each other to form a first magnetic gap and a pair of second magnets spaced apart from each other to form a second magnetic gap, the first voice coil at least partially located in the first magnetic gap, and the second voice coil at least partially located in the second magnetic gap.

3. The speaker as described in claim 2, wherein the pair of the first magnets is flush with the pair of second magnets.

4. The speaker as described in claim 3, wherein the magnetic circuit system further comprises a first pole plate connected to a side of the first magnets and the side of the second magnets proximal to the first diaphragm, and a second pole plate connected to the side of the first magnets and the side of the second magnets proximal to the second diaphragm.

5. The speaker as described in claim 4, wherein the first pole plate comprises a first through slot avoiding the first voice coil and the second voice coil, and the second pole plate comprises a second through slot avoiding the first voice coil and the second voice coil.

6. The speaker as described in claim 4, wherein the first pole plate is embedded and fixed in the first frame, and the second pole plate is embedded and fixed in the second frame.

7. The speaker as described in claim 1, wherein the first vibration system further comprises a first circuit board located between the first frame and the first diaphragm, the first circuit board comprising a first fixation portion mounted with the first frame, a second fixation portion mounted with the first diaphragm, and a first connection portion connecting the first fixation portion and the second fixation portion, the first voice coil secured with the first diaphragm through the second fixation portion, the second vibration system further comprising a second circuit board located between the second frame and the second diaphragm, the second circuit board comprising a third fixation portion mounted with the second frame, a forth fixation portion mounted with the second diaphragm, and a second connection portion connecting the third fixation portion and the forth fixation portion, the second voice coil secured with the second diaphragm through the forth fixation portion.

8. The speaker as described in claim 7, wherein the speaker further comprises a first pin embedded in the first frame to electrically connect the first circuit board with an external circuit, and a second pin embedded in the second frame to electrically connect the second circuit board with the external circuit.

* * * * *